United States Patent
Bachl et al.

(10) Patent No.: US 7,558,229 B2
(45) Date of Patent: Jul. 7, 2009

(54) METHOD FOR REDUCING DISCARDED SLOTS AND FRAMES IN A WIRELESS COMMUNICATIONS SYSTEM

(75) Inventors: Rainer Bachl, Barvaria (DE); Francis Dominique, Rockaway, NJ (US); Hongwei Kong, Denville, NJ (US); Walid Nabhane, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/212,131

(22) Filed: Aug. 25, 2005

(65) Prior Publication Data

US 2007/0076644 A1 Apr. 5, 2007

(51) Int. Cl.
*H04W 4/00* (2009.01)
(52) U.S. Cl. ........................ 370/313; 455/433; 455/436; 455/450; 370/235; 370/441; 370/335; 370/342
(58) Field of Classification Search .................. 455/433, 455/450, 436; 370/335, 342, 341, 235
See application file for complete search history.

(56) References Cited

U.S. PATENT DOCUMENTS

| | | | |
|---|---|---|---|
| 6,747,958 B2* | 6/2004 | Vayanos et al. ............. | 370/252 |
| 6,868,075 B1* | 3/2005 | Narvinger et al. ............ | 370/335 |
| 2003/0108027 A1 | 6/2003 | Kim et al. .................... | 370/345 |
| 2003/0174686 A1* | 9/2003 | Willenegger et al. ........ | 370/342 |
| 2004/0219919 A1* | 11/2004 | Whinnett et al. ............. | 455/442 |
| 2004/0259548 A1* | 12/2004 | Moon et al. .................. | 455/436 |
| 2005/0076283 A1* | 4/2005 | Malkamaki et al. ......... | 714/748 |
| 2005/0094561 A1* | 5/2005 | Raaf ........................... | 370/235 |
| 2005/0220116 A1* | 10/2005 | Ahn et al. ................. | 370/395.4 |
| 2006/0056360 A1* | 3/2006 | Parkvall et al. ............. | 370/335 |

FOREIGN PATENT DOCUMENTS

| | | |
|---|---|---|
| EP | 1 349 328 A1 | 3/2002 |
| WO | WO 01/24566 A1 | 4/2001 |
| WO | WO 2005/034555 A1 | 4/2005 |

OTHER PUBLICATIONS

PCT Search Report from PCT/US2006/031806 dated Dec. 15, 2006.

* cited by examiner

*Primary Examiner*—Rafael Pérez-Gutiérrez
*Assistant Examiner*—Nimesh Patel

(57) ABSTRACT

A method is provided for controlling communications between a base station and a mobile device. The method comprises determining the actual transmission gap and only discarding slots and/or frames that overlap with the actual transmission gap. Slots and/or frames that overlap with a scheduled transmission gap but are outside the actual transmission gap are transmitted.

12 Claims, 5 Drawing Sheets

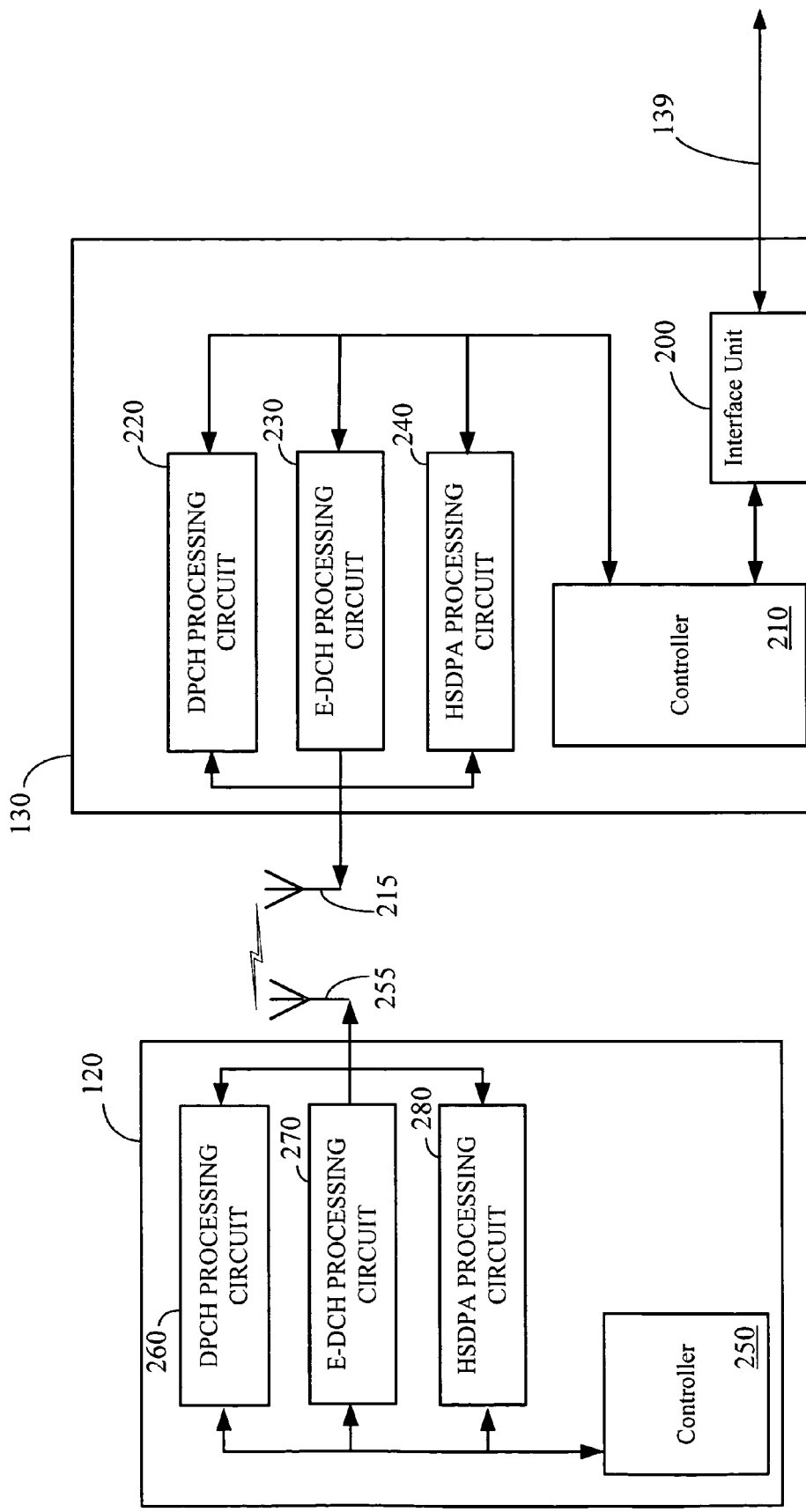

“METHOD FOR REDUCING DISCARDED SLOTS AND FRAMES IN A WIRELESS COMMUNICATIONS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations (or NodeBs in 3GPP ($3^{rd}$ Generation Partnership Project) terminology) distributed within an area to be serviced by the system. Various mobile devices (or User Equipment-UE in 3GPP terminology) within the area may then access the system and, thus, other interconnected telecommunications systems, via one or more of the base stations. Typically, a mobile device maintains communications with the system as it passes through an area by communicating with one or more base stations, as the mobile device moves. The process of moving among base stations is commonly referred to as a soft handoff and it may occur relatively often if the mobile device is moving rapidly. The mobile device may communicate with the closest base station, the base stations with the strongest signal, the base stations with a capacity sufficient to accept communications, etc.

To allow a mobile device to periodically communicate with these other base stations, a wireless system, such as UMTS (Universal Mobile Telecommunications System), allows for gaps to periodically occur where the mobile device is not required to communicate with its current serving base station, but instead use the gap to monitor other base stations to which it may subsequently desire to handoff. Typically, for a small transmission time interval (such as 2 ms (millisecond) data packets in 3GPP-UMTS), when a transmission overlaps with the transmission gap, the entire transmission for that 2 ms packet is cancelled regardless how much the overlap is. Typically, any overlap between a scheduled transmission and the transmission gap will result in the transmission of the slots or frames (if the frame is 2 ms in duration) being cancelled (DTXed). However, canceled transmissions can create significant inefficiencies in wireless systems, such as $3^{rd}$ Generation Partnership Project (3GPP) systems. For example, in the event that a relatively minor overlap with the specified transmission gap occurs, such as a single chip overlap, the entire transmission, such as an entire slot or the 2 ms frame, may be cancelled, even though the slot may be transmitted without negatively affecting communications between the mobile devices and the non-serving base stations during the transmission gap.

SUMMARY OF THE INVENTION

The present invention is directed to overcoming, or at least reducing, the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the instant invention, a method is provided for controlling transmissions that overlap with a transmission gap in a wireless communications system. The method comprises identifying a scheduled transmission gap, and determining an actual transmission gap. The information that overlaps with the scheduled transmission gap and is outside the actual transmission gap is transmitted.

BRIEF DESCRIPTION OF THE DRAWINGS

The invention may be understood by reference to the following description taken in conjunction with the accompanying drawings, in which like reference numerals identify like elements, and in which:

FIG. 2 depicts a block diagram of one embodiment of a base station and a mobile device in the communications system of FIG. 1;

Figure 1:
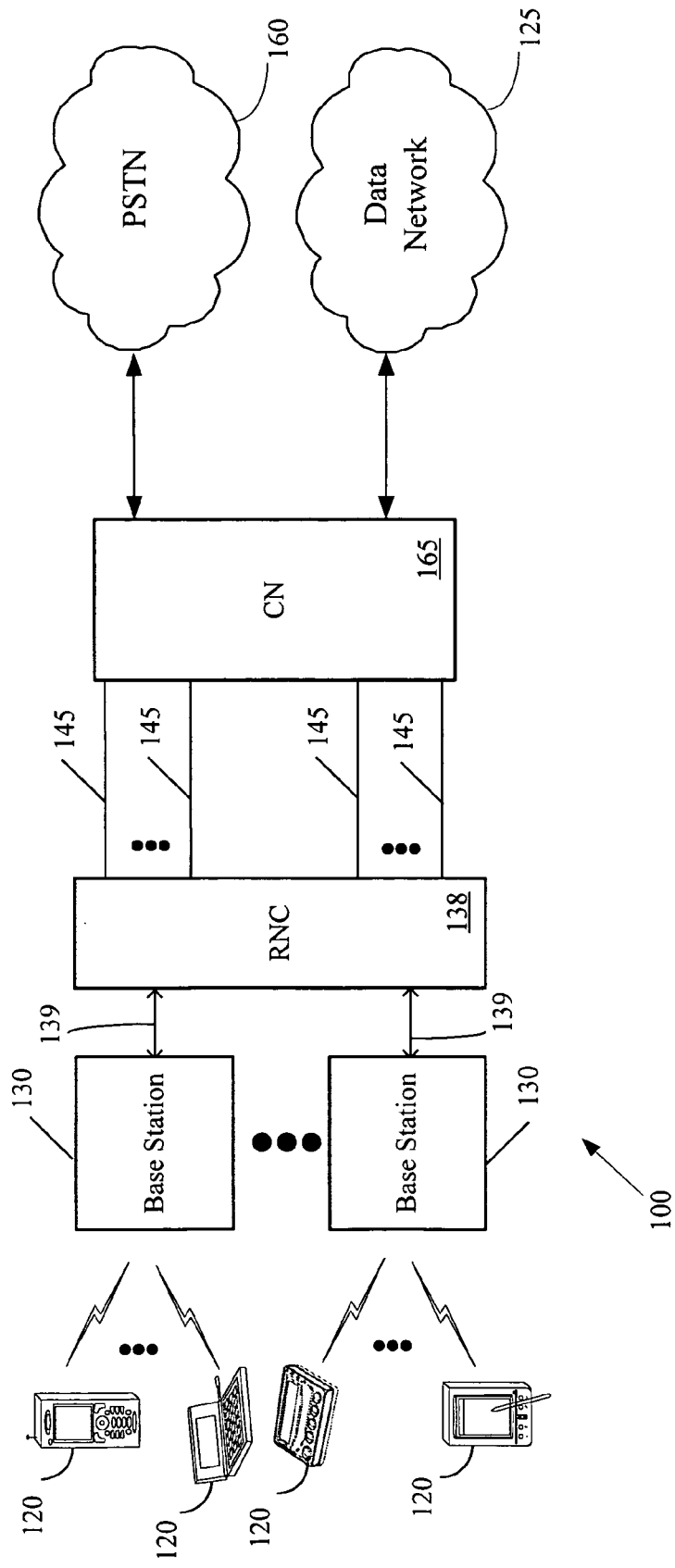
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is generally compliant with technical specifications and technical reports for a $3^{rd}$ Generation Mobile System that have been developed by a $3^{rd}$ Generation Partnership Project (3GPP). Although it should be understood that the present invention may be applicable to other systems that support data and/or voice communications. The communications system 100 allows one or more mobile devices 120 to communicate with a data network 125, such as the Internet, and/or a Publicly Switched Telephone Network (PSTN) 160 through one or more base stations 130. The mobile device 120 may take the form of any of a variety of devices, including cellular phones, personal digital assistants (PDAs), laptop computers, digital pagers, wireless cards, and any other device capable of accessing the data network 125 and/or the PSTN 160 through the base station 130.

In one embodiment, a plurality of the base stations 130 may be coupled to a Radio Network Controller (RNC) 138 by one or more connections 139, such as T1/EI lines or circuits, ATM circuits, cables, optical digital subscriber lines (DSLs), and the like. Although one RNC 138 is illustrated, those skilled in the art will appreciate that a plurality of RNCs 138 may be utilized to interface with a large number of base stations 130. Generally, the RNC 138 operates to control and coordinate the base stations 130 to which it is connected. The RNC 138 of FIG. 1 generally provides replication, communications, runtime, and system management services. The RNC 138, in the illustrated embodiment handles calling processing functions, such as setting and terminating a call path and is capable of determining a data transmission rate on the forward and/or reverse link for each user 120 and for each sector supported by each of the base stations 130.

The RNC 138 is also coupled to a Core Network (CN) 165 via a connection 145, which may take on any of a variety of forms, such as T1/EI lines or circuits, ATM circuits, cables, optical digital subscriber lines (DSLs), and the like. Generally the CN 165 operates as an interface to a data network 125 and/or to the PSTN 160. The CN 165 performs a variety of functions and operations, such as user authentication, however, a detailed description of the structure and operation of the CN 165 is not necessary to an understanding and appreciation of the instant invention. Accordingly, to avoid unnecessarily obfuscating the instant invention, further details of the CN 165 are not presented herein.

The data network 125 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Thus, those skilled in the art will appreciate that the communications system 100 facilitates communications between the mobile devices 120 and the data network 125 and/or the PSTN 160. It should be understood, however, that the configuration of the communications system 100 of FIG. 1 is exemplary in nature, and that fewer or additional components may be employed in other embodiments of the communications system 100 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Referring now to FIG. 2, a block diagram of one embodiment of a functional structure associated with an exemplary base station 130 and mobile device 120 is shown for communications from the base station 130 to the mobile device 120, using the Enhanced Dedicated CHannels (E-DCH), such as the E-HICH, E-AGCH and the E-RGCH channels. The base station 130 includes an interface unit 200, a controller 210, an antenna 215 and a plurality of channels, such as a DPCH (Dedicated Physical CHannel), an E-HICH/E-AGCH/E-RGCH (E-DCH HARQ Indicator CHannel/Absolute Grant CHannel/Relative Grant CHannel) and a HS-SCCH/HS-PD-SCH (High Speed Shared Control CHannel/Physical Downlink Shared CHannel) along with processing circuitry 220, 230, 240 associated with each of these channels. Those skilled in the art will appreciate that the processing circuitry 220, 230, 240 may be comprised of hardware, software or a combination thereof.

The interface unit 200, in the illustrated embodiment, controls the flow of information between the base station 130 and the RNC 138 (see FIG. 1). The controller 210 generally operates to control both the transmission and reception of data and control signals over the antenna 215 and the plurality of channels between the base station 130 and the mobile device 120, and to communicate at least portions of the received information to the RNC 138 via the interface unit 200. The DPCH processing circuit 220 transmits data and control information to the mobile device 120 over the DPCH channel. In E-DCH applications, the data part in DPCH may be absent but pilot, TFCI (Transport Format Combination Indicator) and TPC (Transmit Power Control) bits are still present and can be used by the mobile device 120 to do tasks such as channel estimation, power control and measurement, channel monitoring, etc. The HS-SCCH/PDSCH processing circuit 240 sends HSDPA (High Speed Downlink Packet Access) control and data information to the mobile device 120 over the HS-SCCH/PDSCH channels, which is processed by the HSDPA processing circuit 280 in the mobile device 120. Typically, the HS-SCCH channel carries control information about the HS-PDSCH channel, such as the block size, retransmission sequence number, etc, while the HS-PDSCH carries the actual packet data for HS-DSCH (High Speed Downlink Shared CHannel). In the mobile device 120, the information derived from HS-SCCH is used by the HS-PDSCH processing circuit 240 to process the data sent by the base station 130 over HSDPA channels. The E-HICH/E-AGCH/E-RECH processing circuit 230 is E-DCH related processing. It sends ACK/NACK information, absolute and relative grants to the mobile device 120 to aid the high speed uplink communications using E-DPCCH and E-DPDCH. The E-HICH/E-AGCH/E-RECH channels are processed by the E-HICH/E-AGCH/E-RECH processing circuit 270 in the UE 120.

The mobile device 120 shares certain functional attributes with the base station 130. For example, the mobile device 120 includes a controller 250, an antenna 255 and a plurality of channels and processing circuitry, such as a DPCH processing circuit 260, an E-HICH/E-AGCH/E-RECH processing circuit 270, a HS-SCCH/PDSCH processing circuit 280, and the like. The controller 250 generally operates to control both the transmission and reception of data and control signals over the antenna 255 and the plurality of channels 260, 270, 280.

Normally, the channels in the mobile device 120 communicate with the corresponding channels in the base station 130. Under the operation of the controllers 210, 250, the channels and their associated processing circuits 220, 260;

230, 270; 240, 280 are used to effect a controlled scheduling for communications from the base station 130 to the mobile device 120.

Typically, operation of the channels and their associated processing circuits 260, 270, 280 in the mobile device 120 and the corresponding channels and processing circuits 220, 230, 240 in the base station 130 have been subframe (2 ms), frame (8 ms) or frame (10 ms) operated.

Periodically, the mobile devices 120 are permitted to monitor other base stations 130 in the immediate area. In this way, the mobile devices 120 may periodically determine the quality of communications that would be available with alternative serving base stations 130. Ultimately, the mobile devices 120 may "decide" to move to a different serving base station 130 or communicate with multiple base stations 130 based on various measured criteria. At that time, the mobile device 120 will enter a soft handoff mode and the process will be implemented through the coordinated efforts of at least the current serving base station 130, the target base station 130 and the mobile device 120.

During these periods of time when the mobile devices 120 are permitted to monitor other base stations 130, the mobile device 120 has to interrupt its communication with the serving base station 130. This interruption is achieved by canceling all transmissions for a certain amount of time from the serving base station 130 to that specific mobile device 120. Likewise all transmissions to the serving base station from the mobile device 120 are also cancelled during the same period of time. The cancelled period of time is usually referred to as a "transmission gap." For E-DCH and HSDPA related channels (E-HICH, E-AGCH, E-RGCH, HS-SCCH, HS-PDSCH) with short data frames (e.g., 2 ms), when a transmission overlaps with a transmission gap, the transmission is cancelled. For transmissions from the base station 130 to the mobile device 120, there are two different types of DPCH frame structures that may be used. Type A transmissions maximize the transmission gap length, whereas type B transmissions are optimized for power control. Transmission gap length is usually measured in slots and may take values between 3 and 14. For both types of transmissions, the actual transmission gap may vary from the scheduled transmission gap.

Figure 3A:
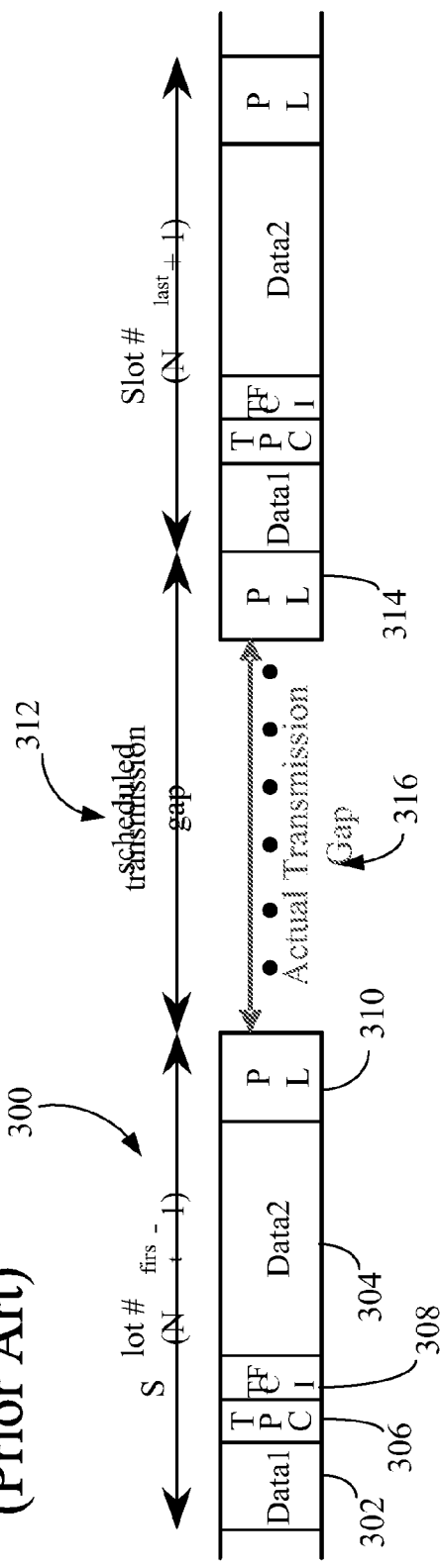
FIGS. 3A and 3B depict timing diagrams illustrating a scheduled and actual transmission gap for two types of transmissions.

Turning to FIG. 3A, a timing diagram illustrating an actual transmission gap for a Type A frame structure is shown. A slot 300 (Slot # $N_{first-1}$) is generally defined by a preselected duration of time, such as 2/3 msec., and is comprised of a plurality of predefined fields, such as two data fields (Data1 and Data2) 302, 304, a Transmission Power Control (TPC) field 306, Transmit Format Control Information (TFCI) 308 and a Pilot field (PL) 310. Generally, a scheduled transmission gap 312 is comprised of a whole integer multiple number of slots, such as 3 slots (2 msec). For Type A frame structures, the PL 314 of the last slot that falls in the scheduled gap 312 is transmitted. Thus, the mobile device 120 is still "listening" and receiving information during the period of time that corresponds to the transmission of the PL 314. Accordingly, the actual transmission gap 316 ends at the time that the PL 314 is transmitted, and is shorter than the scheduled transmission gap 312. For Type A frame structures, the actual transmission gap 316 is shorter than the scheduled transmission gap 312 by the length of the PL 314, as indicated in the following equation:

Actual Transmission Gap (in chips)=$(N_{last}-N_{first}+1)\times$ 2560−Pilot_field_Length (in chips).

In effect, the mobile device 120 only discards slots and subframes that overlap with the actual transmission gap 316. Thus, in at least some embodiments of the instant invention it may be efficient for the base station 130 to continue transmitting to the mobile device 120 as long as the slot and/or subframe overlaps with the scheduled transmission gap but not the actual transmission gap.

Figure 3B:
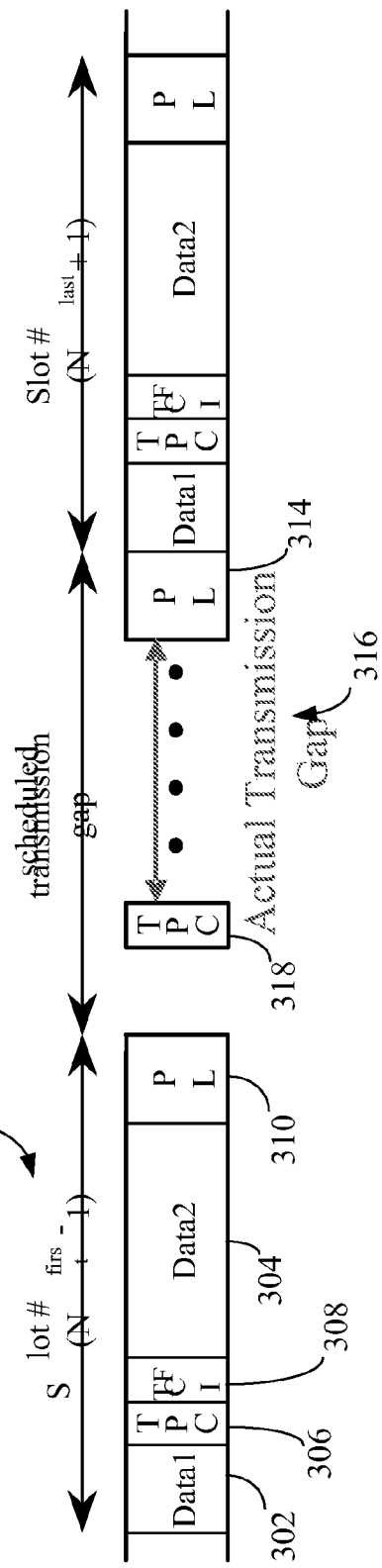

Turning now to FIG. 3B, a timing diagram illustrating the actual transmission gap 312 for a Type B frame structure is shown. The makeup and duration of a slot and a scheduled transmission gap 312 in a Type B frame structure is substantially identical to the makeup and duration of slots and scheduled transmission gaps 312 in Type A frame structures discussed above. For Type B frame structures, the TPC field 318 of the first slot falling within the scheduled transmission gap 312 is transmitted and decoded. Thus, the mobile device continues "listening" and receiving information until the end of the TPC field 318. Accordingly, the actual transmission gap 316 starts after the reception of the TPC field 318, which should ordinarily end 512 chips from the start of the slot, in at least some embodiments of the instant invention. Also, like Type A frame structures, the PL field 314 of the last slot falling within the scheduled transmission gap 312 is ordinarily transmitted. Thus, the actual transmission gap 316 is shorter than the scheduled transmission gap 312, as per the following equation:

Actual Transmission Gap(in chips)=$(N_{last}-N_{first}+1)\times$ 2560−Pilot_field_Length (in chips)−512.

Accordingly, as discussed above in conjunction with Type A frame structures, since the mobile device 120 only discards slots and/or subframes that overlap with the actual transmission gap 316, it may be efficient for the base station 130 to continue transmitting to the mobile device 120 as long as the slot and/or subframe overlaps with the scheduled transmission gap but not the actual transmission gap.

Figure 4:
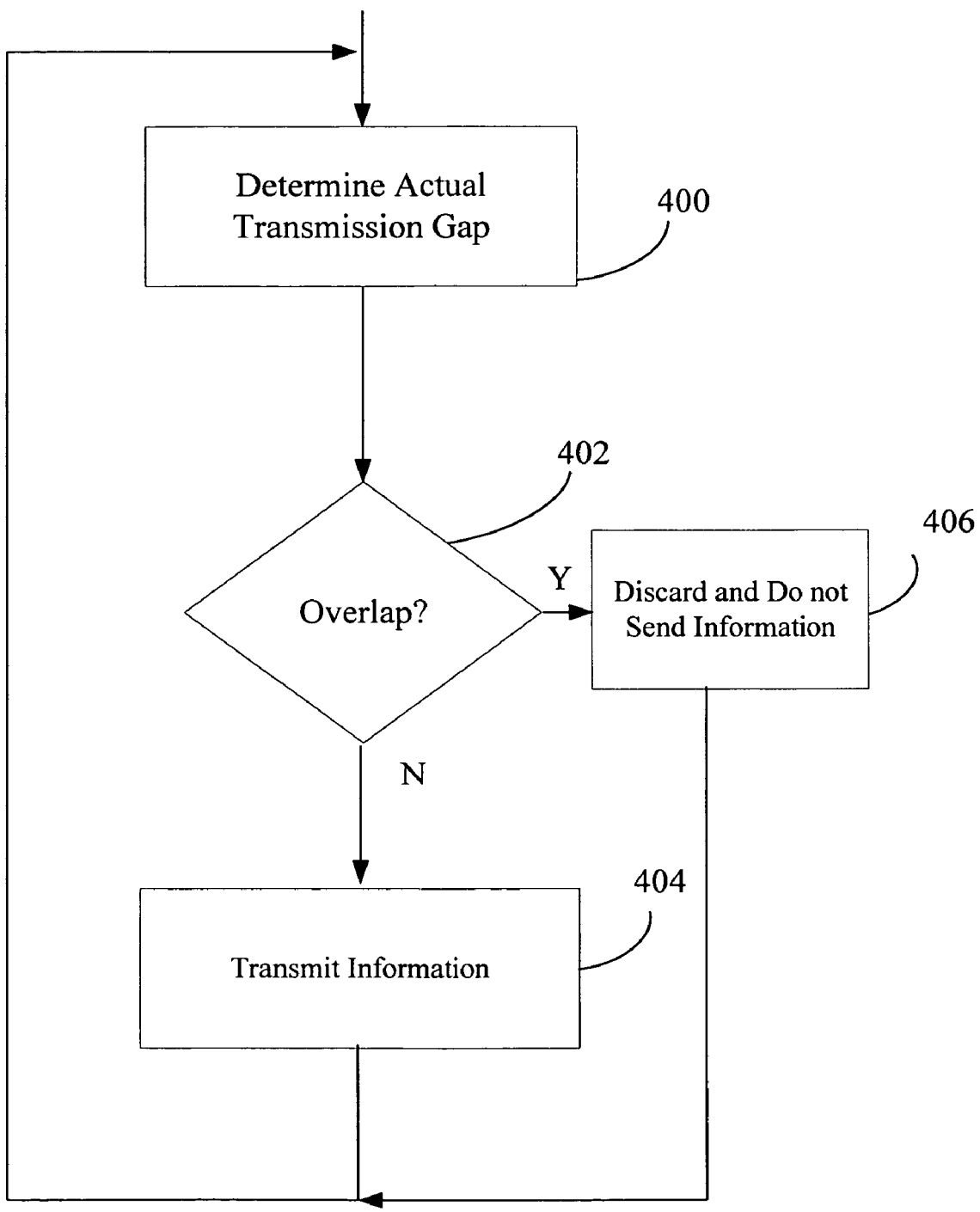
FIG. 4 illustrates a flowchart depicting operation of one embodiment of a base station in the communications system of FIG. 1.

Operation of the instant invention may be appreciated by reference to the flow chart of FIG. 4. The process begins at block 400 with the base station 130 determining the actual transmission gap 316, which, as discussed above with respect to FIGS. 3A and 3B, is a function of the frame type (e.g., A or B) of a scheduled transmission gap 312. Thereafter in block 402 the various channels are checked to identify any transmissions that overlap with the actual transmission gap 316. These overlapping transmissions are discarded and not sent by the base station 130 at block 406. However, at block 404, those transmissions that fall within the scheduled transmission gap 312 but are outside the actual transmission gap 316 are sent by the base station 130 to the mobile device 120.

Figure 5:
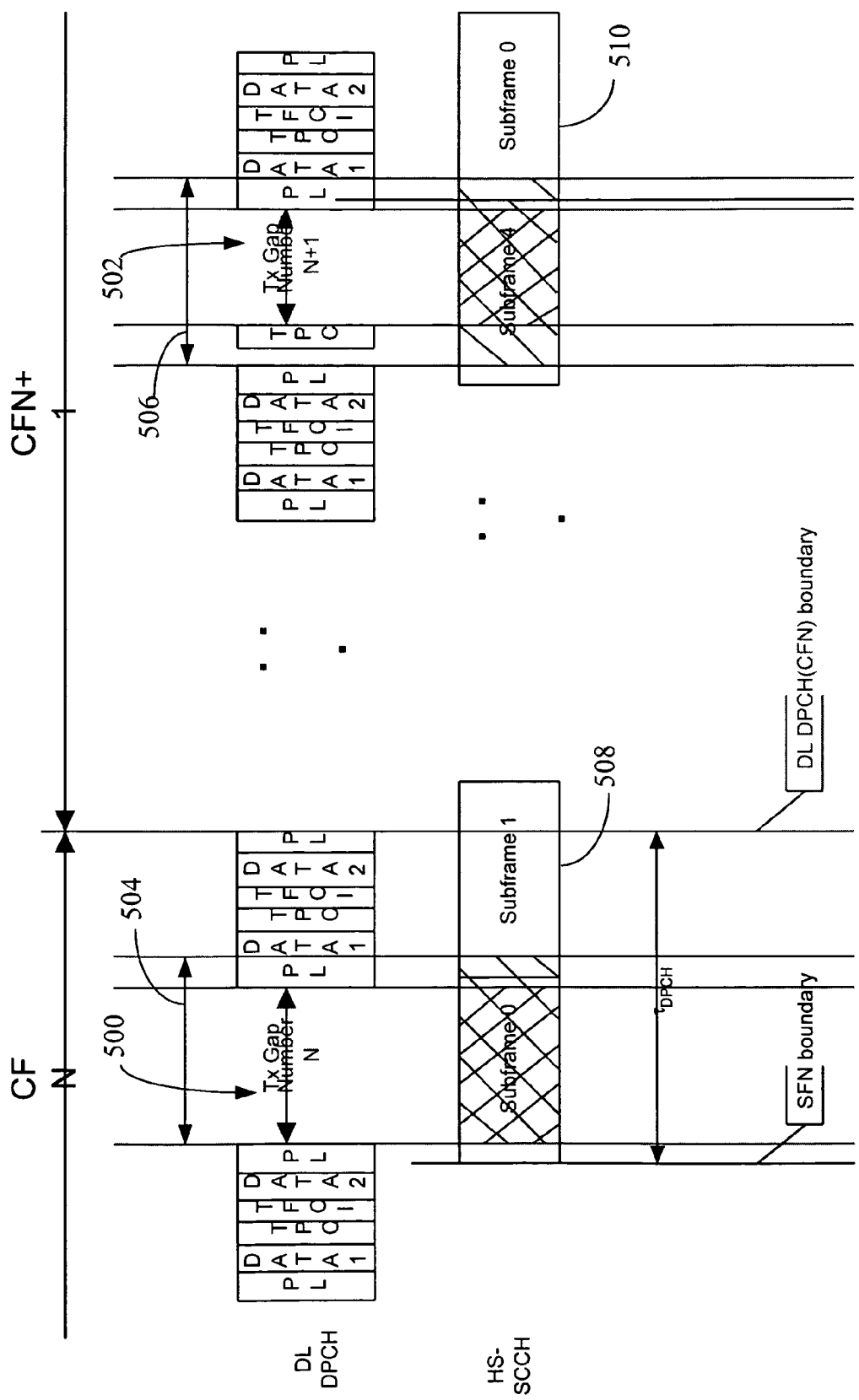
FIG. 5 depicts a timing diagram illustrating the operation of one embodiment of the instant invention with respect to the two types of transmissions illustrated in FIGS. 3A and 3B.

Turning now to FIG. 5, an example of an overlap between the HSDPA channels (HS-SCCH in this case) and the associated DPCH is shown. Since the DPCH frame and the HS-SCCH frames are not aligned, there can be up to 2 independent actual transmission gaps 500, 502 overlapping with a single frame of the HS-SCCH (an HS-SCCH frame consists of subframe 0 to subframe 4 in FIG. 5). If any single-chip duration overlap exists between the transmission gap 500, 502 and the HS-SCCH, then the subframe is discarded and ignored by the mobile device 120. Therefore, the subframe will not be able to be used by the base station 130.

As can be seen from FIG. 5, if the scheduled transmission gap 504, 506 is used to check the overlap, Subframe1 508 associated with CFN and Subframe0 510 associated with CFN+1 overlap only very slightly with the scheduled transmission gaps 504, 506. However, if the actual transmission gaps 500, 502 are used to check the overlap, Subframe1 508 associated with CFN and Subframe0 510 associated with CFN+1 do not overlap with the actual transmission gaps 500, 502. Thus, these subframes can be preserved and transmitted to the mobile device 120, since the mobile device 120 will be monitoring the HS-SCCH during the entire period of time associated with Subframe1 508 and Subframe0 510.

It will be appreciated by those skilled in the art that FIG. 5 illustrates a frame type A for the actual transmission gap 500 and a frame type B for the actual transmission gap 502 for illustrative purposes only. Ordinarily, a channel will use only one of the frame types at a time.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), an FPGA, an ASIC (Application Specific Integrated Circuits), an ASSP (Application Specific Standard Product) or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for controlling transmissions that overlap with a transmission gap in a wireless communications system, comprising:

identifying a scheduled transmission gap, the scheduled transmission gap indicating a time period when a mobile unit is not required to communicate with a base station on at least one uplink channel;

determining an actual transmission gap when the mobile unit does not communicate with the base station on said at least one uplink channel, the actual transmission gap being equal to the scheduled transmission gap minus at least one time interval used to transmit at least one of a transmission power control field, a transmit format control information field, or a pilot field;

transmitting a short data frame scheduled for transmission on at least one downlink channel to the mobile unit during a time period that overlaps with the scheduled transmission gap and is outside the actual transmission gap; and discarding the short data frame scheduled for transmission on said at least one downlink channel during a time period that overlaps with the actual transmission gap.

2. A method, as set forth in claim 1, wherein discarding the short data frame that overlaps with the actual transmission gap further comprises not transmitting the short data frame that overlaps with the actual transmission gap.

3. A method, as set forth in claim 1, wherein determining an actual transmission gap further comprises determining the actual transmission gap based on a type of frame structure associated with the transmission gap.

4. A method, as set forth in claim 3, wherein determining the actual transmission gap based on the type of frame structure associated with the transmission gap further comprises determining the actual transmission gap for a type A frame structure.

5. A method, as set forth in claim 4, wherein determining the actual transmission gap for the type A frame structure further comprises determining the actual transmission gap to be the time between the beginning of the scheduled transmission gap and the beginning of a pilot field of a last slot that falls in the scheduled gap.

6. A method, as set forth in claim 3, wherein determining the actual transmission gap based on the type of frame structure associated with the transmission gap further comprises determining the actual transmission gap for a type B frame structure.

7. A method, as set forth in claim 6, wherein determining the actual transmission gap for the type B frame structure further comprises determining the actual transmission gap to be the time between an end of a transmit power control field of the first slot falling within the scheduled transmission gap and the beginning of a pilot field of a last slot that falls in the scheduled gap.

8. A method, as set forth in claim 1, wherein transmitting the short data frame that overlaps with the scheduled transmission gap and is outside the actual transmission gap further comprises transmitting the short data frame over an HSDPA channel.

9. A method, as set forth in claim 8, wherein transmitting the information over an HSDPA channel further comprises transmitting the data frame over at least one of an HS-SCCH and an HS-PDSCH.

10. A method, as set forth in claim 1, wherein transmitting the short data frame that overlaps with the scheduled transmission gap and is outside the actual transmission gap further comprises transmitting the short data frame over an E-DCH channel.

11. A method, as set forth in claim 10, wherein transmitting the data frame over an E-DCH channel further comprises transmitting the data frame over at least one of an E-HICH, E-AGCH and E-RGCH.

12. A method, as set forth in claim 1, wherein identifying a scheduled transmission gap further comprises specifying the scheduled transmission gap on a dedicated physical channel.

* * * * *